(12) United States Patent
Simson

(10) Patent No.: US 6,308,995 B1
(45) Date of Patent: Oct. 30, 2001

(54) QUICK RELEASE COUPLING DEVICE FOR HOLLOW BODY

(75) Inventor: Dionizy Simson, Winterthur (CH)

(73) Assignee: Simson Innovationen, Winterthur (DE)

( * ) Notice: Subject to any disclaimer, the term of this patent is extended or adjusted under 35 U.S.C. 154(b) by 0 days.

(21) Appl. No.: 09/554,939
(22) PCT Filed: Nov. 13, 1998
(86) PCT No.: PCT/CH98/00491
   § 371 Date: Jul. 17, 2000
   § 102(e) Date: Jul. 17, 2000
(87) PCT Pub. No.: WO99/27280
   PCT Pub. Date: Jun. 3, 1999

(30) Foreign Application Priority Data

Nov. 21, 1997 (CH) .................................. 2693/97

(51) Int. Cl.$^7$ ........................................ F16L 21/08
(52) U.S. Cl. .............. 285/305; 285/321; 285/902; 285/340; 285/308
(58) Field of Search ............... 285/337, 321, 285/303, 340, 902, 39, 308

(56) References Cited

U.S. PATENT DOCUMENTS

| | | | |
|---|---|---|---|
| 1,825,962 | * 10/1931 | Laird | 285/340 |
| 1,937,881 | * 12/1933 | Fisher | 285/340 |
| 2,457,077 | * 12/1948 | Woolsey | 285/340 |
| 2,611,505 | 9/1952 | Winborn et al. . | |
| 2,757,945 | * 8/1956 | Bingham | 285/340 |
| 2,869,910 | 1/1959 | Fisher et al. . | |
| 3,463,518 | * 8/1969 | Broussard et al. | 285/340 |
| 3,530,685 | * 9/1970 | Ehret | 285/321 |
| 3,584,313 | * 6/1971 | Brown et al. | 285/321 |
| 3,606,393 | * 9/1971 | Huntsinger et al. | 285/321 |
| 3,637,239 | * 1/1972 | Daniel | 285/321 |
| 3,741,591 | * 6/1973 | Fessler et al. | 285/321 |
| 3,773,360 | * 11/1973 | Timbers | 285/321 |
| 4,082,321 | * 4/1978 | Nakajima et al. | 285/321 |
| 4,456,288 | * 6/1984 | Conner | 285/321 |
| 4,603,886 | * 8/1986 | Pallini, Jr. et al. | 285/321 |
| 5,603,532 | * 2/1997 | Guest | 285/321 |

FOREIGN PATENT DOCUMENTS

| | | |
|---|---|---|
| 0403724 | 12/1965 | (CH) . |
| 1474846 | 3/1967 | (FR) . |
| 2022252 | 9/1969 | (FR) . |
| 2488968 | 5/1981 | (FR) . |
| 2134206 | 8/1984 | (GB) . |

* cited by examiner

Primary Examiner—Eric K. Nicholson
(74) Attorney, Agent, or Firm—Sidley Austin Brown & Wood, LLP

(57) ABSTRACT

The invention relates to a quick release coupling device comprising an annular groove (4) formed on the inner face of one of the hollow bodies, a projecting part (6) formed on the other hollow body (2) and a force transmitting member (5) engaged with the groove and the projecting part (6). A shoulder (23) is provided for fixing the force transmitting member (5) to hinder the loosening of the coupling under loading. The inventive device is advantageous in that its design and use are straightforward while meeting the requirements related to safety and ease of cleaning.

8 Claims, 5 Drawing Sheets

Figure 6:
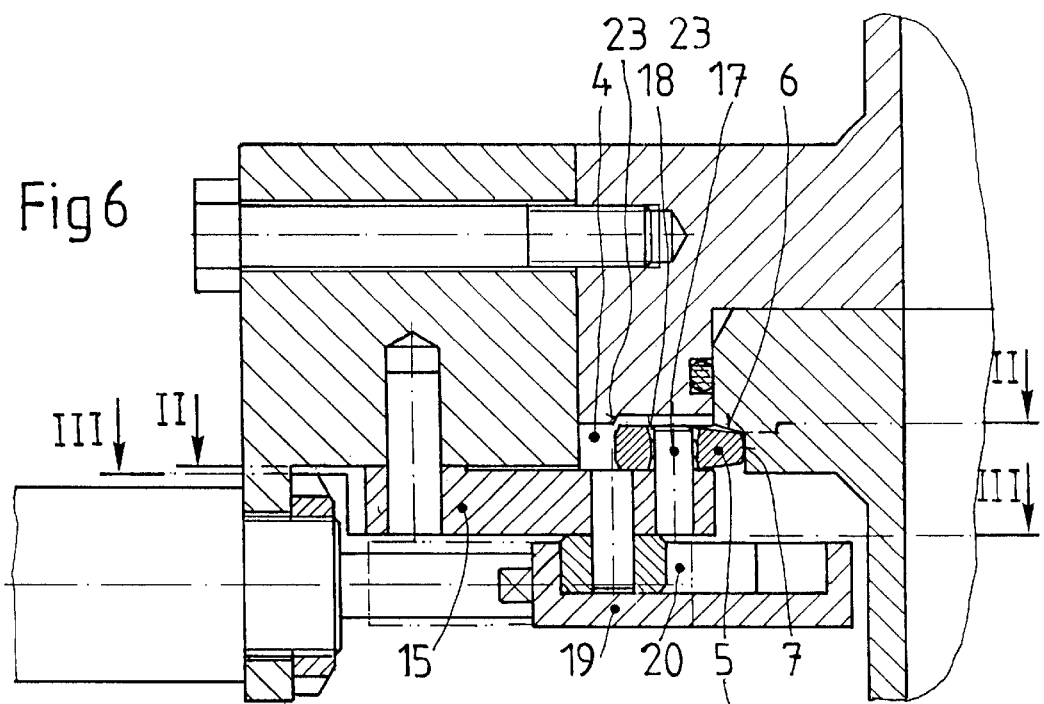

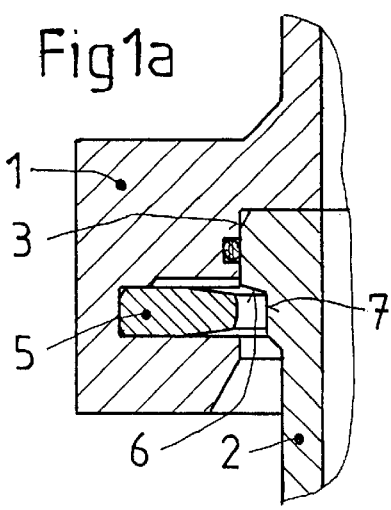
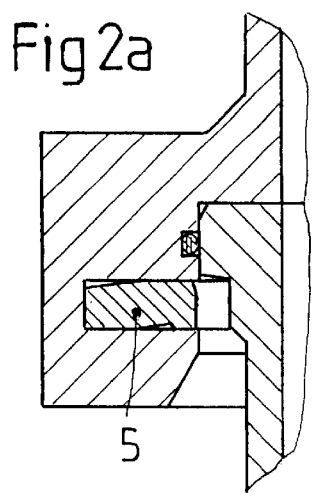
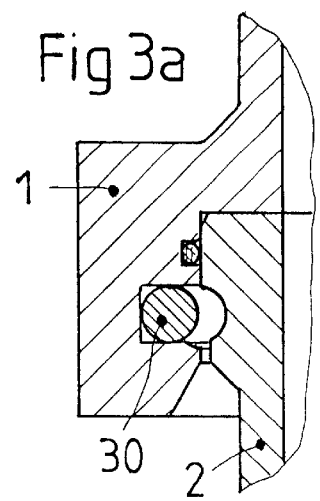
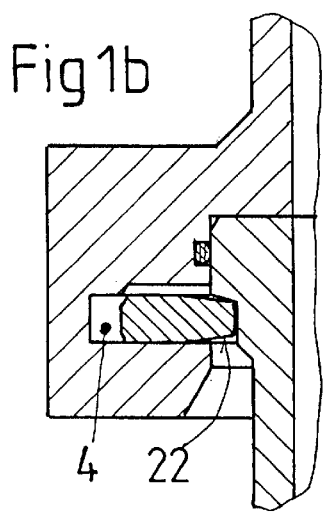
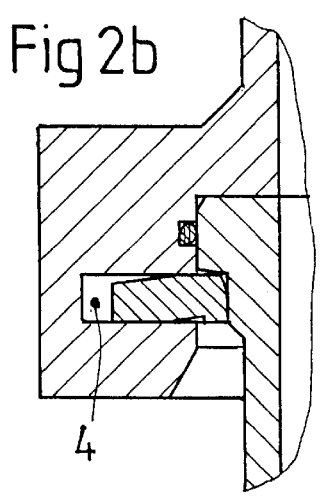
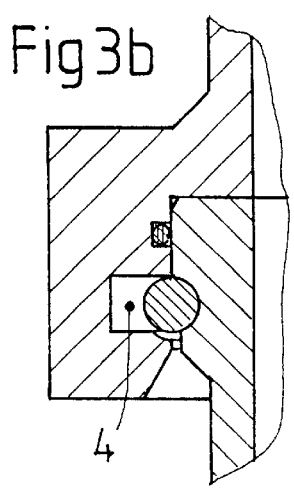
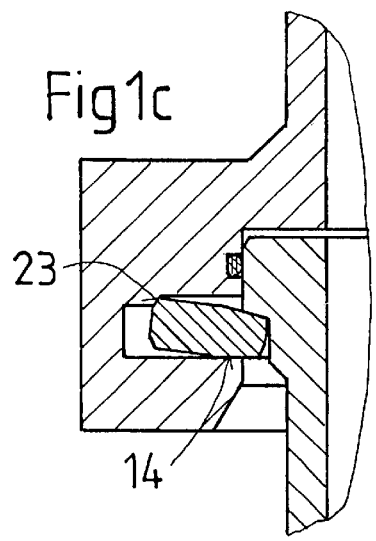
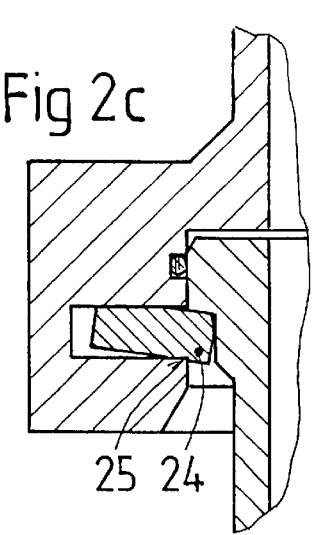
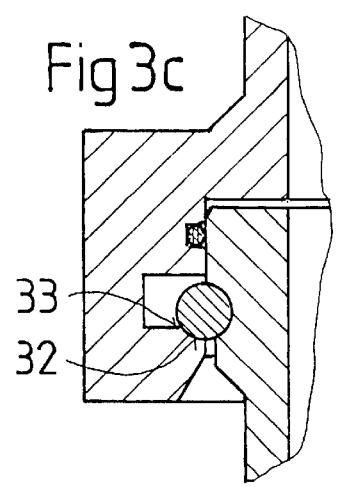

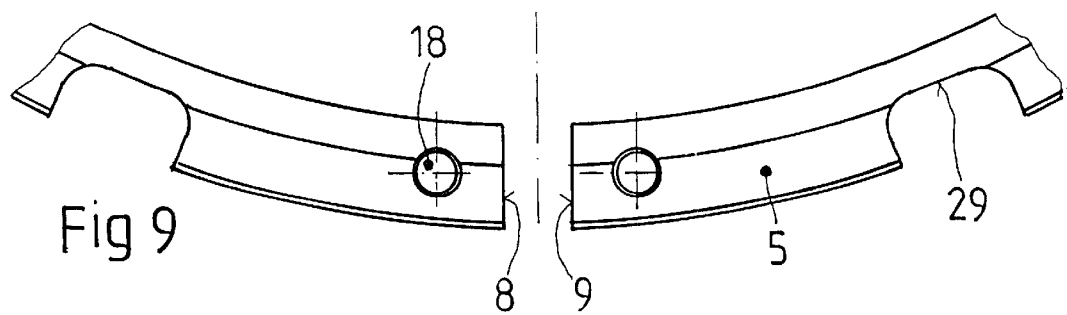
Fig 9
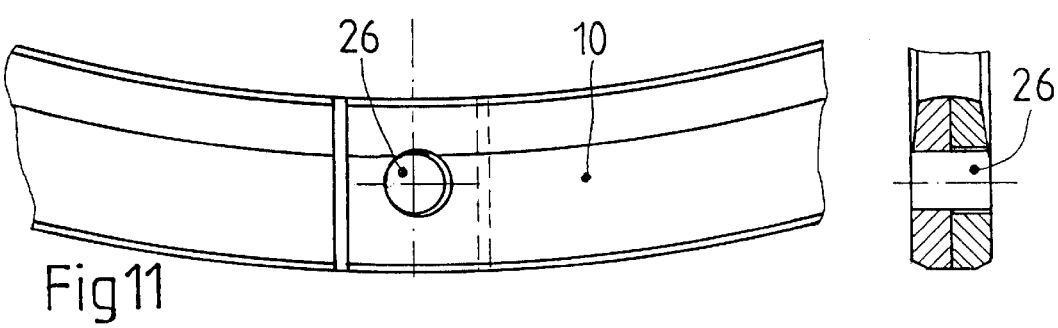
Fig 10
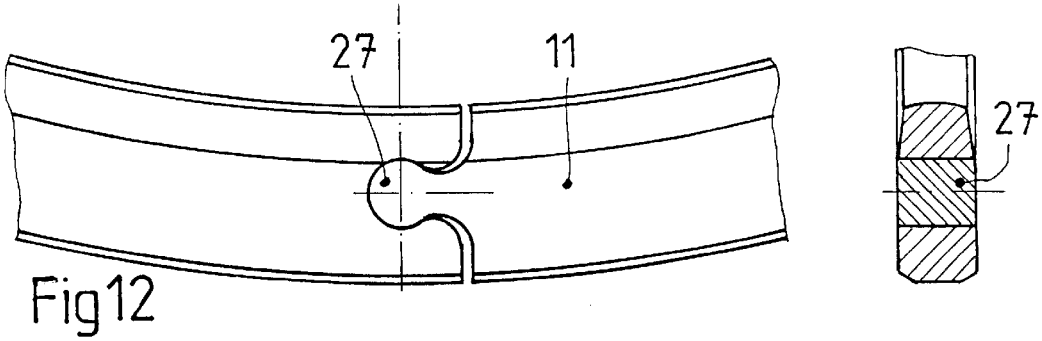
Fig 11
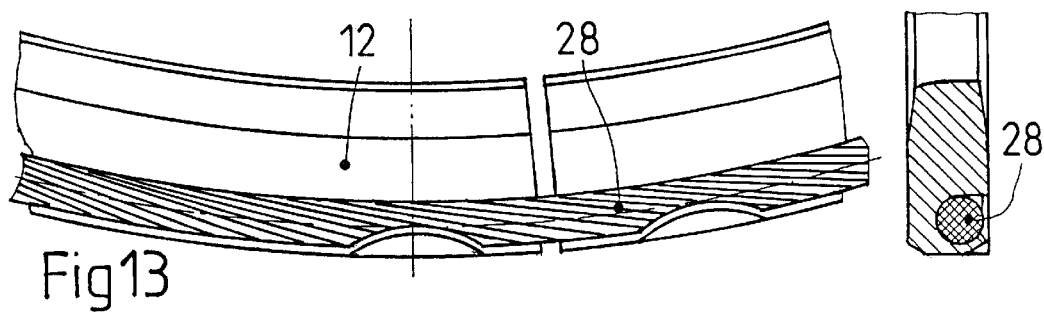
Fig 12
Fig 13

QUICK RELEASE COUPLING DEVICE FOR HOLLOW BODY

The invention relates to a quick release coupling device according to preamble of claim 1 and a device for establishing of quick release coupling.

Known are coupling systems that formlockingly connect with each annular flanges, which are provided on a separate hollow bodies, with screws or stirrupt bolts. The drawback of these systems consists in that a substantial time is required for screwing and unscrewing of a plurality of screws. Further, bayonet joints are also known. Those consist of an annular flange with recesses formed in its circumference and an annular mating flange with projections which engage in the recesses. A formlocking connection between separate hollow bodies is established by rotation of the hollow bodies in opposite direction by a width of one recess. The drawbacks here are high manufacturing costs and a need to rotate the hollow body or a separate ring about a rotational axis. Also, systems with toothed segments are also known which are pushed, from inside or from outside, in corresponding grooves in the hollow bodies with wedges or control rings. (White, U.S. Pat. No. 4,832,976, Rexroth, DE 1,475,128, Klepper, DE 717229, Sulzer, EPO-513466A1, Nippone Steel DE 3,932,225A1). Other solutions are based on radially displaceable clamp segments (Babcock, DE 1,050,139, Uhde, EPO 093878, ABB W093.19311, Udhe, DE 4,102, 622A1, Unteco, DE 3,721,942A1).

These systems have a number of expensive and awkward parts which, in addition, do not correspond to a need for cleanness. Also are known couplings in which an elastically deformable ring is used as a force transmitting member. Those can have a cross-section of a round rod (R. Bosch, FR 2,678,027A3, Messerschmitt-Bolkow-Blom, DT 2,623, 937A1, of a clamp (Scholz, DE 3,421907C1) or of a flat bar (General Descaling, EP 0129 349A2, Mondo, CH 525 415). Though round rods are very cost-effective and occupy less space, they are suitable only for small loads as the bearing surfaces are not uniformly loaded. In a U-shaped clamp, the transmitted forces cause bending stresses, so that the cross-section should be large, and the expanding mechanism should be correspondingly strong. Besides, the elastically deformable force transmitting elements do not insure safety against an undersized opening (Uhde, DE 4,102,662,A1).

It is also known to provide a pressure vessel and a cover with a device which can be relatively quickly secured and released in order to close or open the vessel. Such a device is disclosed in DE-A 39 32 225. This device includes an annular groove formed on the inner side of the vessel, a projection formed on the cover, and a plurality of holding segment-like elements which are put together to form a holding ring and which absorb forces generated by the inner pressure to force—or formlockingly connect the vessel parts. The drawback of this device consists in that it is designed for holding a cover.

The invention, as characterized in the claims, solves the object of improving the connection.

The advantages achieved by the invention consists in that a formlocking connection is rapidly established with simple and cost-effective means, and the requirements with respect to safety and ease of cleaning are met.

Below, the invention will be explained with reference to accompanying drawings.

Figure 4:
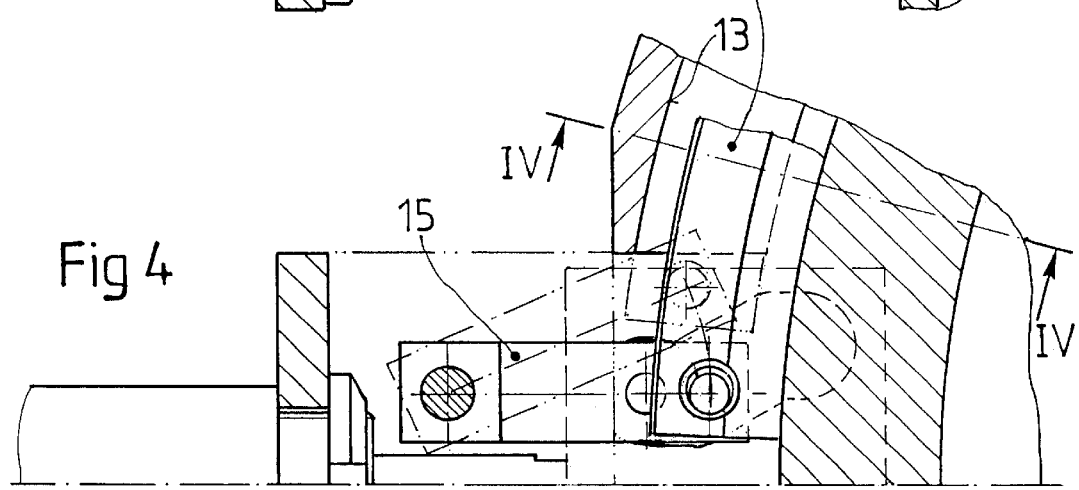
Figure 5:
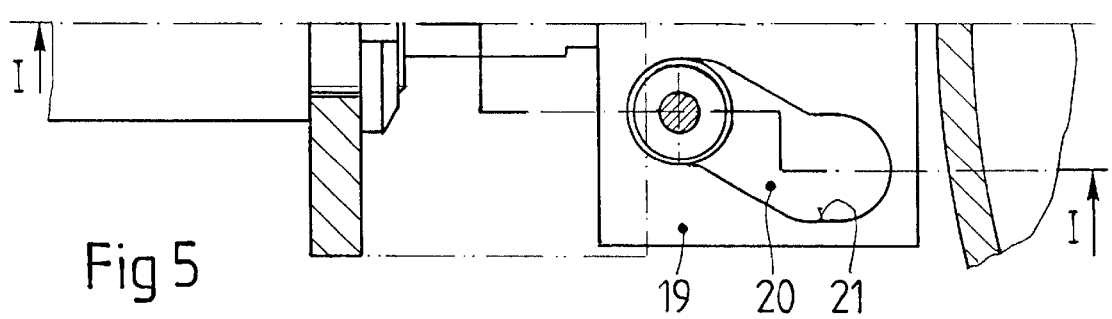
Figure 7:
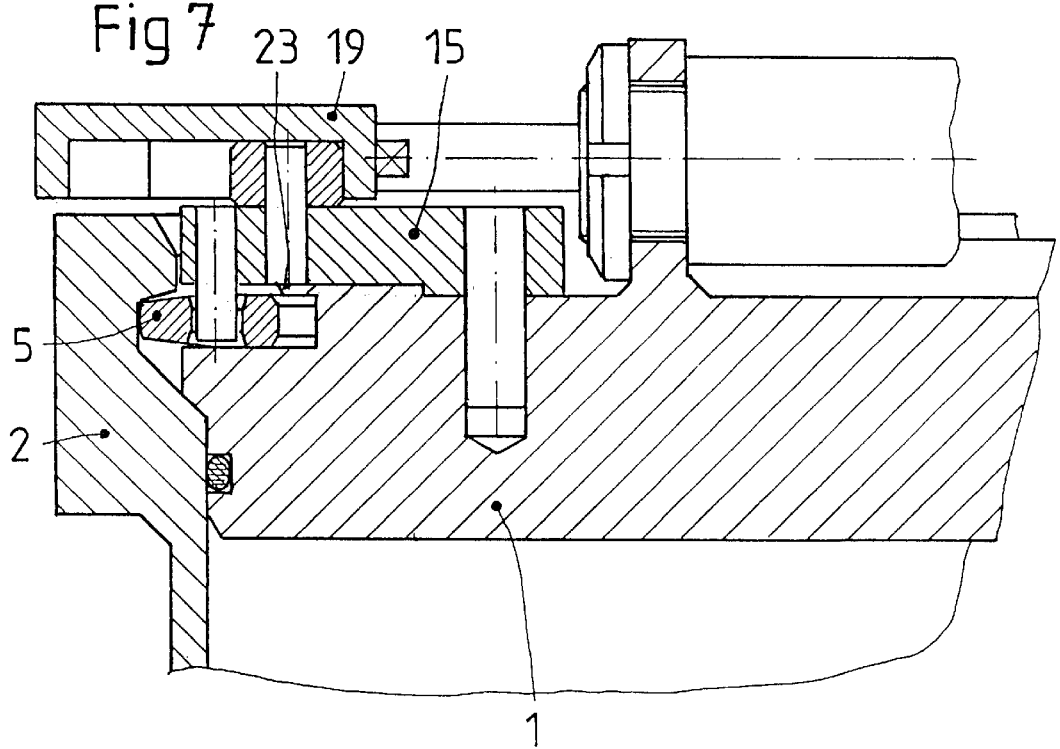
Figure 8:
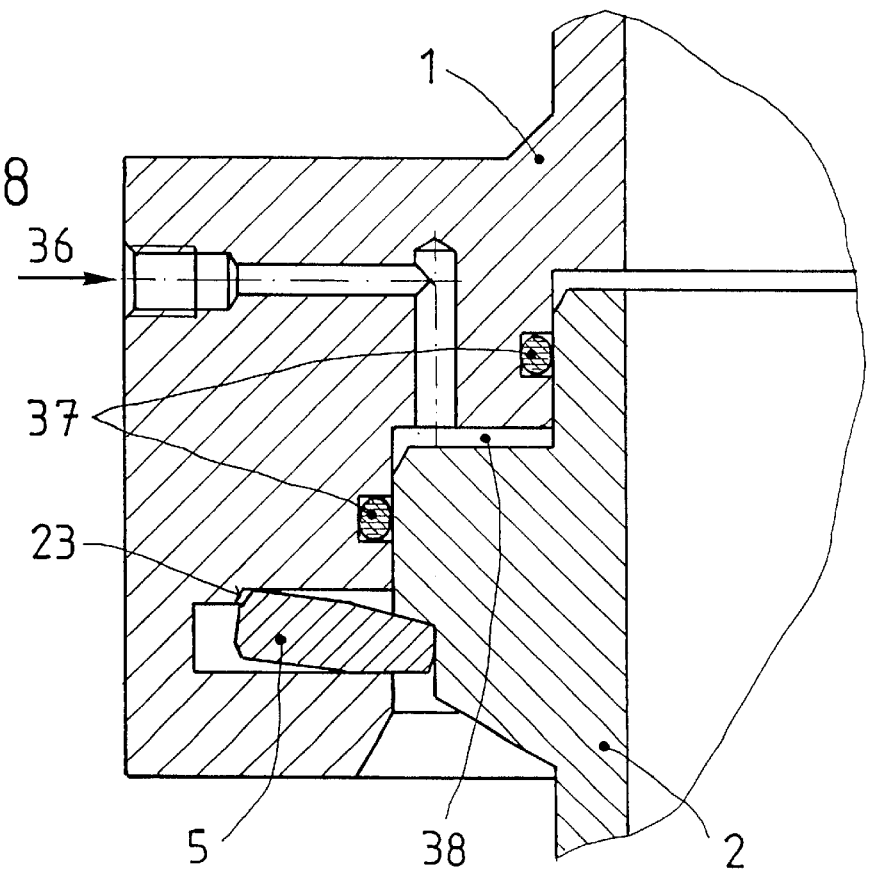
Figure 14:
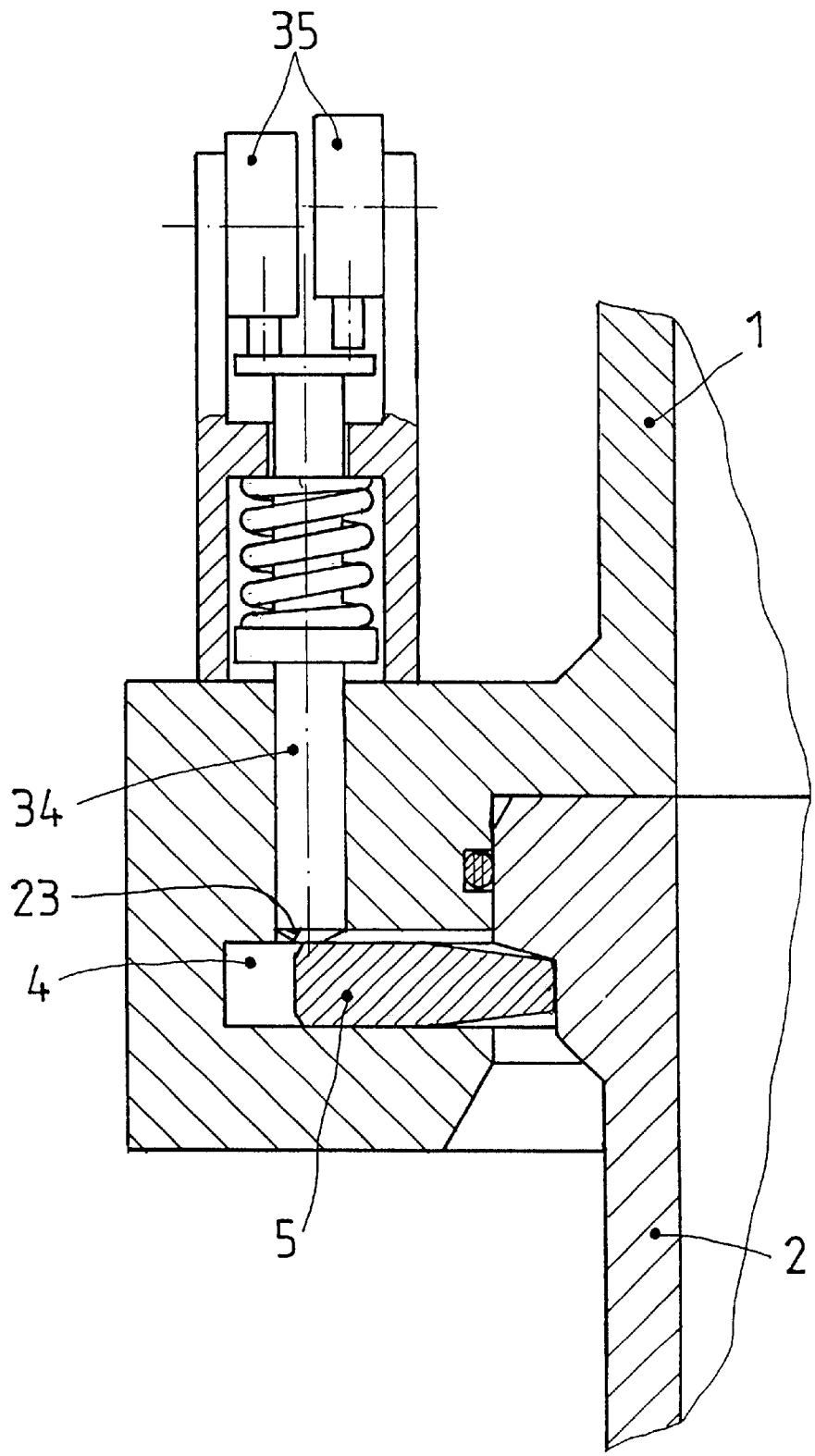

The drawings show:

FIGS. 1a to 1c a cross-sectional view along line IV—IV of a first embodiment of quick release coupling according to the invention in open, closed non-loaded, and closed loaded positions;

FIGS. 2a to 2c a second embodiment of quick release coupling according to the invention;

FIGS. 3a to 3c a third embodiment of quick release coupling according to the invention;

FIG. 4 a cross-sectional view along line II—II in FIG. 6;

FIG. 5 a cross-sectional view along line III—III in FIG. 6;

FIG. 6 a first embodiment of a device for effecting quick release coupling;

FIG. 7 a second embodiment of a device for effecting quick release coupling;

FIG. 8 a device for adjusting force transmitting means;

FIG. 9 an elastic force transmitting element with notches;

FIG. 10 an elastic force transmitting element formed of a round bar with eyelets;

FIG. 11 a first embodiment of hinged force transmitting means;

FIG. 12 a second embodiment of hinged force transmitting means;

FIG. 13 a third embodiment of hinged force transmitting means;

FIG. 14 a device for monitoring a position of the force transmitting means.

A force transmitting member 5 is formed advantageously as a spring washer. The spring washer is inserted without preload in a groove 4 or is arranged, with a preload, on the groove bottom 13 or against a stop 7 when the actuation forces are insufficient. Rigid segments, which are hingedly connectable with each other by bolts 26, or claws 27 or assembled on a steel cable 28, present further possibilities of forming the force transmitting element 5. In order to reduce the actuation forces, a massive force transmitting element 5 is provided with notches 29 which insure its elasticity in a radial direction. In order to avoid an unintended opening when a force transmitting element having a circular cross-section is used, the container bodies 1 and 2 are displaced slightly in an axial direction, whereby the force transmitting element 30 assumes a smaller diameter (or a larger diameter at inner locking) and abuts a stop surface 31. The stop surface 32 contacts the force transmitting element 30, and a protruding bulge 33 makes an unintended withdrawal of the force transmitting element 30 impossible.

The force transmitting elements 5 and 30 can be removed from the groove 4 very quickly by an unexperienced personnel with a handle, which is very important for cleaning and sterilization.

The connectable parts of the pressure containers or pressure vessels 1 and 2 are engaged in each other in a section defined by a separating surface 3. One of the vessels 1 has a groove 4 into which the force transmitting element 5 can be inserted at least with one of inner or outer surfaces being flush, and the other of the vessels 2 has a projection part 6 with a stop 7 which transmits to the force transmitting member 5 forces generated by the inner pressure in the vessel. The force transmitting member can be placed on the vessel either from inside or from outside. The separating surface 3 of the pushed into each other, vessel parts 1 and 2 can be, viewed from the longitudinal axis, circular, approximately circular, oval, approximately oval, polygonal with rounded corners, or approximately polygonal.

The force transmitting member 5 is a structure with a finite length with two or several defined and lying adjacent to each other ends 8 and 9 which are ideally or approximately correspond to the separating surface. This member can be either elastic (5) or be formed of hingedly connected parts 10, 11, and 12.

Before the vessel parts 1 and 2 are pushed into each other, the force transmitting member on the bottom 13 of the groove 4 is brought into the open position by compressing and expanding the ends 8 and 9. After vessel parts 1 and 2 have been pushed one into the other, the ends 8 and of the force transmitting member 5 are compressed or expanded in order to bring the force transmitting member 5 into its force transmitting position in which the force transmitting member 5 abuts stop 7 on the projecting part 6. The forces, which are generated by inner pressure within the vessel are transmitted to the force transmitting member, 5 in which they produce shear stresses, and further to a shoulder 14 of the groove 4 in the other vessel part 1. The expansion or compression of ends 8 and 9 of the force transmitting member is effected with lever mechanism, manually, with pneumatic, hydraulic or electrical adjusting element (not shown). The lever 15 is provided with pegs 17 or openings 18. The pegs 17 engage the force transmitting member 5 or 30. In the embodiment of the lever 15, those are displaced by a cam plate 19. The above-described process is effected with an external actuation device (FIG. 6). FIG. 7 shows an internally located actuation device which is based on the same principle, with the insertion and removal of the force transmitting member being effected in the opposite direction.

The loaded force transmitting member 5 can, upon application of larger forces, be brought out of its force transmitting position because the automatic interlock is nor sufficient for the absolute security. In order to insure the functional reliability, the force transmitting member 5 is kept under a preload. To facilitate this, the force transmitting member 5 is provided with inclined surfaces 22. Under a small load, the inclined force transmitting member 5 engages a shoulder 23 of the groove 4 or the nose 24 of the groove edge 25, so that its position cannot be changed. Only after being unloaded, the force transmitting member 5 occupies, under a biasing force, its initial position and can move radially. For tilting the force transmitting member 5, an inner pressure of the hollow body can be used, or it can be retained, under external pressure, in an annular channel 38 sealed with two seals 27 (FIG. 14).

Sterilization without dismounting the spring washer is easily possible because in a locking condition, the annular clearance between the bottom 13 of the groove 4 and the force transmitting member has a simple geometry and, therefore, the loaded condition is easily calculated or evaluated.

In order to ascertain whether the force transmitting member 5 is located in a force transmitting position, suitable sensors for sensing the position are provided in the vessel part 1 or 2. As an example of such implementation of sensors, pins 34, which actuate one or more end switches 35, are provided in the groove 4. The end switches 35 generate signals for subjecting the vessel 1 and 2 to pressure and after application of the pressure load, for displacement of the force transmitting member 5, in the open position.

What is claimed is:

1. A quick release coupling device for hollow bodies subjected to a pressure, the device comprising an annular groove (4) formed on an inner side of a hollow body (1), a projection (6) formed on another hollow body (2), and at least one force transmitting member (5) which engages both the groove and the projection, wherein a shoulder (23, 25) is formed in the groove (4) or on the force transmitting member (5) in order to secure the force transmitting member, and wherein the device further comprises a retaining member secured on the hollow body, a cam plate adjustably arranged on the retaining member, and two levers pivotally arranged on the retaining member and connected with the force transmitting member engaging the same in order to compress or expand the force transmitting member and to lock it in a respective end position, and an arrangement of channels for a pressurized medium for displacing the force transmitting member in an operational position.

2. A quick release coupling device for hollow bodies subjected to a pressure, which device includes an annular groove (4) formed on an inner side of a hollow body (1), a projection (6) formed on another hollow body (2), and at least one force transmitting member (5) which engages both the groove and the projection, wherein a shoulder (23, 25) is formed in the groove (4) or on the force transmitting member (5), in order to secure the force transmitting member, and wherein the device further comprises a retaining member secured on the hollow body, a cam plate adjustably arranged on the retaining member, and two levers pivotally arranged on the retaining member and connected with the force transmitting member engaging the same in order to compress or expand the force transmitting member and to lock it in a respective end position, and means for monitoring the force transmitting member which means is formed as a scanning member arranged in an operational contact with the force transmitting member and provided with a signal pick-up for outputting a position of the force transmitting member.

3. A quick release coupling device for hollow bodies subjected to a pressure, which device includes an annual groove (4) formed on an inner side of one hollow body (1), a projection (6) formed on another hollow body (2), and at least one force transmitting member (5) which engages both the groove and the projection, wherein a shoulder (23, 25) is formed in the groove (4) for securing the force transmitting member (5) in a predetermined radial position when the hollow bodies (1,2) are subjected to the pressure, and wherein the force transmitting member is formed with inclined surfaces (22) providing for a pivotal movement of the force transmitting member relative to the groove which insures an interlocking engagement of the force transmitting member with the shoulder when the hollow bodies are subjected to the pressure.

4. A device according to claim 3, wherein the shoulder (25) is formed by an edge limiting the groove and extending along a circumference of the one hollow body, and the force transmitting member (5) is formed with a nose (24) adjoining one of the inclined surfaces (22) and engaging the edge.

5. A device according to claim 3, wherein the force transmitting member consists of at least two rigid or elastic parts forming a ring.

6. A device according to claim 5, wherein the parts are connected by at least one hinge.

7. A device according to claim 3, further comprising a retaining member secured the one hollow body, two levers (15) pivotally arranged on the retaining member and connected with the force transmitting member, and a cam plate (19) adjustably arranged on the retaining member and engageable with the force transmitting member for compressing or expanding the force transmitting member and for locking same in a respective end position.

8. A device according to claim 7, comprising means for adjusting a cam plate (19).

* * * * *